June 23, 1953 A. B. JACOBSEN 2,643,333

DATA TRANSMISSION SYSTEM

Filed Nov. 29, 1945 5 Sheets-Sheet 1

INVENTOR
ANDREW B. JACOBSEN
BY
[signature]
ATTORNEY.

INVENTOR
ANDREW B. JACOBSEN

BY

ATTORNEY

June 23, 1953 A. B. JACOBSEN 2,643,333

DATA TRANSMISSION SYSTEM

Filed Nov. 29, 1945 5 Sheets-Sheet 3

INVENTOR
ANDREW B. JACOBSEN
BY
Ralph L. Chappell
ATTORNEY

June 23, 1953 A. B. JACOBSEN 2,643,333

DATA TRANSMISSION SYSTEM

Filed Nov. 29, 1945 5 Sheets-Sheet 4

INVENTOR
ANDREW B. JACOBSEN
BY
Ralph L Chappell
ATTORNEY

June 23, 1953 A. B. JACOBSEN 2,643,333

DATA TRANSMISSION SYSTEM

Filed Nov. 29, 1945 5 Sheets-Sheet 5

INVENTOR
ANDREW B. JACOBSEN

BY

ATTORNEY

Patented June 23, 1953

2,643,333

UNITED STATES PATENT OFFICE 2,643,333

DATA TRANSMISSION SYSTEM

Andrew B. Jacobsen, Somerville, Mass., assignor, by mesne assignments, to the United States of America as represented by the Secretary of the Navy Application November 29, 1945, Serial No. 631,746

7 Claims. (Cl. 250—27)

This invention relates to data transmission systems, and more particularly such systems for producing remote synchronous rotation by position data rather than velocity data.

It has already been proposed to use remote radar apparatus, particularly search apparatus, to receive information which is relayed by radio to a home station where the information is presented on a cathode ray tube screen. For convenience it will be assumed hereafter that the search apparatus is airborne, and that the home station is shipborne, but this is not necessarily the case. The apparatus requires relay transmission not only of the transmission pulse and echoes, commonly referred to as the video data, but also precise and dependable synchronization of a sweep at the home station or ship with the scanning movement of the antenna at the search station or aircraft. One method of doing this is disclosed in a copending application of Stanley N. Van Voorhis, Serial No. 594,258 filed May 17, 1945, now Patent No. 2,567,862 dated September 11, 1951. This involves derivation of sine and cosine synchronizing pulses, which are position modulated, that is, the time position of these pulses is a measure of the sine and cosine of the azimuth angle of the radar beam, preferably referred to north.

The primary object of the present invention is to generally improve data transmission systems of the character specified.

In the Van Voorhis application referred to above, the transmission pulse is selected by its large amplitude. This has the disadvantage that random strong transmission pulses from other transmitters may trigger the receiver falsely, thereby upsetting the data transmission, and illuminating the indicator screen. This is particularly bad because of the high persistence of plan position indicator (hereinafter referred to as P. P. I.) screens. One object of the present invention is to avoid selection of the transmission pulse by amplitude. Instead all pulses may be of equal amplitude, and their selection and discrimination is independent of amplitude.

In the Van Voorhis application above referred to the synchronizing data (hereinafter referred to as "sync data") is transmitted after the video data. This has the disadvantage that a false trigger will illuminate the high persistence indicator screen. In accordance with one feature of the present invention the basic pulse and sync data are transmitted before the transmission pulse and video data, and inasmuch as a degree of discrimination of the sync data is obtained, as hereinafter described, this greatly reduces the chance of a random pulse falsely illuminating the indicator screen.

The complete data then comprises a basic pulse, sine pulse, cosine pulse, transmission pulse, and echoes or video. One object of the present invention is to provide a system in which the receiver will fall into step with the transmitter quickly after any random start, preferably within one cycle. A further object of the invention is to provide apparatus which will insure that the receiver will not remain out-of-step with the transmitter in the event of one or more pulses being missed. Still another object of the invention is to provide some protection against interfering pulses being misinterpreted as though they are data pulses, this being done by limiting the time interval during which random pulses can interfere with the operation of the system.

The foregoing objects are fulfilled generally by the provision of a series of gates which are triggered by the pulses and which are so relatively timed as to prevent the receiver from remaining out-of-step for more than one cycle. A further object of the invention is to accomplish this by the use of gates which add a minimum of complication to the apparatus because the gates are useful for other purposes in the apparatus.

Another object is to provide a suitable circuit for converting the position modulation of the sine pulse relative to the basic pulse into an alternating current which accurately follows the position modulation of the sine pulse, and a similar circuit which accurately converts the position modulation of the cosine pulse relative to the sine pulse.

To accomplish the foregoing general objects and other more specific objects which will hereinafter appear, my invention resides in the circuit elements and their relation one to another as are hereinafter more particularly described in the following specification. The specification is accompanied by drawings in which.

Figure 1:
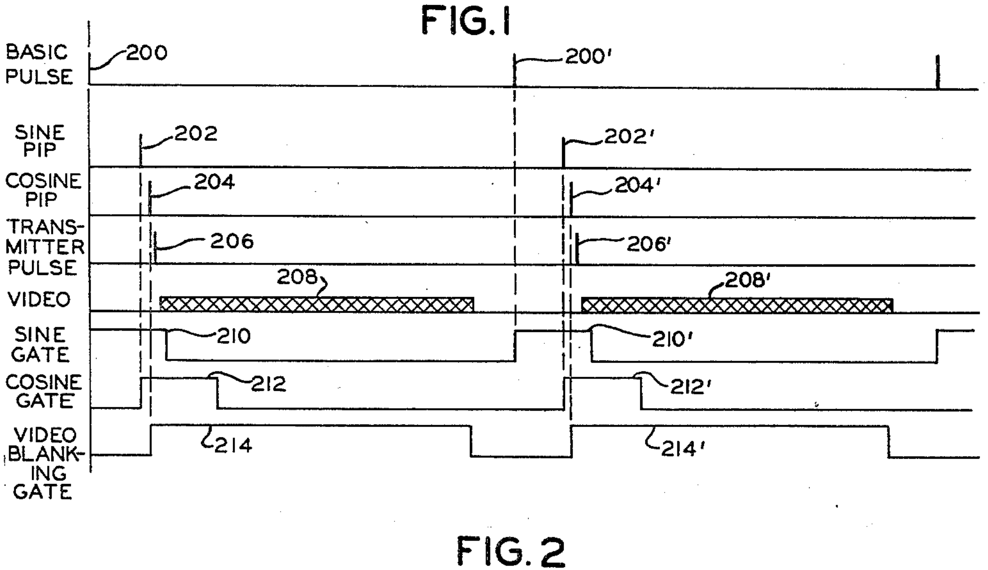
Fig. 1 is a timing diagram explanatory of the invention.

Referring to the drawing, and more particularly to Fig. 1, the basic pulse is indicated at 200. This is put on a special radio relay carrier wave, which may be either amplitude modulated or carrier modulated. The sine pulse is inidcated at 202. The position of this pulse varies to the left or right depending on the sine of the azimuth angle of the scanning beam. In other words, the significant thing is not the size of the pulse, but the time interval between the basic pulse 200 and the sine pulse 202. The cosine pulse is indicated at 204 and its position depends on the cosine of the azimuth angle. In this case the interval is preferably that measured from the sine pulse, rather than the basic pulse, in order to take advantage of the fact that the cosine decreases as the sine increases, and vice versa, so that the over-all time needed is minimized. The transmission pulse is indicated at 206 and follows shortly after the cosine pulse 204. The echo region or video is indicated at 208.

It may be well to describe the derivation of the sine and cosine synchronizing pulses (hereinafter called "sync pulses"). The airborne synchronizer receives from selsyn elements mounted on the spinner base a pair of amplitude-modulated 400-cycle voltages, whose amplitudes vary sinusoidally with the rotation of the scanning antenna. Specifically, the amplitude of the modulation envelope of one of these voltages is always proportional to the sine of the angle between the radar beam and true north, while the amplitude of the envelope of the other voltage is always proportional to the cosine of this same angle. Thus the two envelopes are 90° out of phase, and their frequencies are equal and the same as that of the antenna rotation, which in one particular case was six cycles per minute.

Within the synchronizer, the modulation envelopes of these two signals are detected as sinusoidal voltages, one of which is referred to, in the discussion of the synchronizer, as the "sine voltage" and the other as the "cosine voltage." The sine voltage is then used in conjunction with the basic pulse to generate a sharp voltage signal or pip, whose time separation from the basic pulse is always proportional to the sine of the azimuth angle of the radar beam referred to north. This is the sine sync pulse. The cosine voltage, in a precisely similar manner, is used in conjunction with the sine pulse to generate a second voltage pip, whose time separation from the sine pulse is always proportional to the cosine of the azimuth angle. This is the cosine sync pulse. The set of three pulses, comprising the basic pulse, the sine pulse and the cosine pulse, constitute the azimuth synchronization signals that are sent to the ship through the radar relay system; and it is essential to keep in mind that the azimuth information is embodied in the time intervals separating these signals, not in any feature of the individual signals themselves.

The basic pulse occurs at the start of each repetition cycle, and is the fixed reference point, recurring at precisely equal intervals. Following the basic pulse comes the sine pulse, and the time interval from the basic pulse to the sine pulse is proportional to the sine of the azimuth angle. This time interval therefore varies continually, as the scanning antenna rotates. Following the sine pulse comes the cosine pulse, and the time interval from the sine pulse to the cosine pulse is proportional to the cosine of the azimuth angle, so that this time interval also varies as the antenna rotates. Following the cosine pulse there is the transmitter pulse. This last signal is concerned with triggering of the shipboard indicator sweeps, so that they will be synchronized in range with the airborne indicator sweeps.

In one particular design the repetition frequency was 300 cycles, causing the interval between the basic pulse 200 and the next basic pulse 200′ to be approximately 3333 microseconds. The sine pulse 202 followed the basic pulse by an amount varying from 50 to 325 microseconds, the midpoint corresponding to 0° or 180° of azimuth. The cosine pulse 204 followed the sine pulse by an interval varying from 50 to 325 microseconds, the mid-value corresponding to 90° or 270° of azimuth. The transmitter pulse followed the cosine pulse by approximately 35 microseconds. An additional interval of 2400 microseconds was allowed for the video region 208. The next basic pulse 200′ followed the video region 214 by several hundred microseconds.

In accordance with the present invention, the basic pulse 200 triggers a sine gate 210, this gate being at least long enough to overlap the sine pulse, although it may also overlap the cosine pulse, and even the transmission pulse. The sine pulse 202 triggers a cosine gate 212, but by the use of an appropriate coincidence circuit, this will not happen unless the sine gate 210 is coincident with the sine pulse. The cosine gate 212 is at least long enough to overlap the cosine pulse, but it may also overlap the transmission pulse. The cosine pulse 204 triggers a video blanking gate 214, and here again an appropriate coincidence circuit is used so that the cosine pulse and the cosine gate 212 must be coincident. The video blanking gate 214 prevents an incoming pulse from triggering the sine gate 210, thus establishing a circle of gates which safeguards the operation in a manner explained later. In the particular apparatus here described, the sine gate and cosine gate were each 600 microseconds in length, but could be made as long as 1000 microseconds. The video blanking gate 214 was 2500 microseconds in length, and might be increased to 2750 microseconds in length. The length of this gate is such as to include the desired video region 208, yet leave an interval at the end of gate 214 before the reception of the next basic pulse 200′.

If when the receiver is turned on the first pulse received is a transmitter pulse 206, this will falsely trigger the sine gate 210. That gate will terminate during the video period and the cosine gate and video blanking gate will not be turned on, hence no video will appear on the screen. However, when the next basic pulse appears the sine gate will again be triggered and the receiver will fall into step with the transmitter, as it should.

If when the receiver is turned on the first pulse received is a cosine pulse 204, this will falsely trigger the sine gate 210. The transmission pulse 206 will falsely trigger the cosine gate 212. That gate will terminate during the video period and the video blanking gate will not be turned on hence no video will appear on the screen. When the next basic pulse appears the sine gate will be triggered, and the receiver will fall into step with the transmitter as it should.

If the sine pulse were received first it would trigger the sine gate whereupon the cosine pulse would trigger the cosine gate whereupon the transmission pulse would trigger the video blanking gate and some video will appear on the screen improperly but on reception of the next basic pulse the sine gate will be triggered and the receiver will fall into step with the transmitter as it should.

Similar correction within one cycle takes place if a random pulse is received. It will be understood that the sine gate makes it possible for the sine pulse to trigger the cosine gate; that the cosine gate makes it possible for the cosine pulse to trigger the video gate; but that the video gate makes it impossible for any pulses to trigger the sine gate or cosine gate so long as the video gate persists. It is only after the video gate has terminated that it becomes possible for an incoming pulse to trigger the sine gate. Consequently, random pulses are ineffective to upset the sync relationship during the long video periods.

Figure 2:
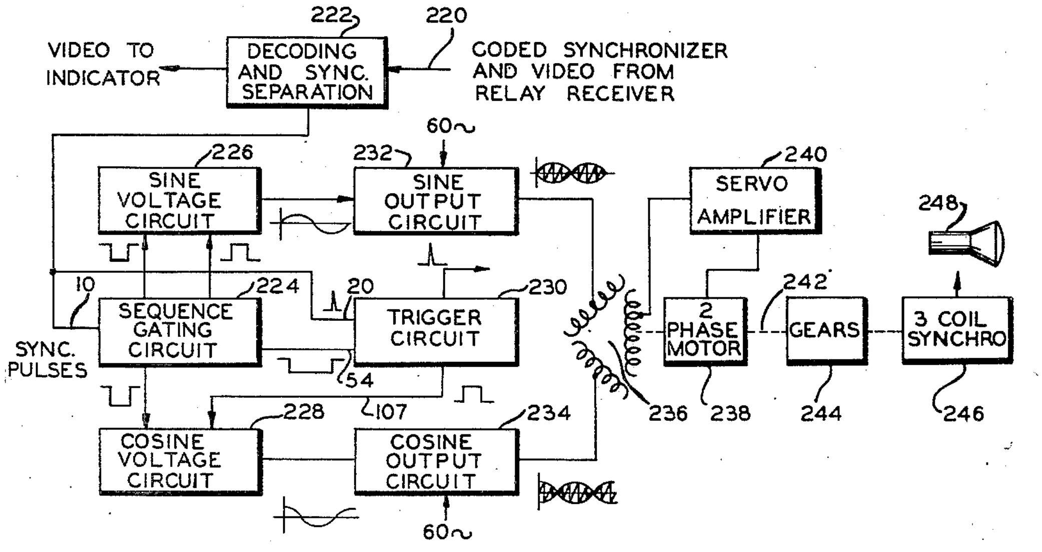
Fig. 2 is a block diagram for apparatus embodying features of the invention.

Referring now to Fig. 2, this diagram shows apparatus which receives the output of the relay receiver and converts this to a form suitable for use by the ship's radar indicators.

The output of the relay receiver, supplied at 220, contains coded sync signals and radar video. (It may also contain IFF video signals, hereinafter disregarded as not necessary to understand the invention). The indicator sweeps are triggered only at the time of the transmitter pulse, so that the sync pulses do not appear on the indicator screens. The sync pulses are decoded, and separated from the video signals at 222. The code system is disclosed and claimed in my copending application Serial No. 617,151 filed September 18, 1945.

The sync pulses are supplied to a sequence gating circuit 224 which generates triggers and gates from the sync pulses, for use by sine and cosine voltage circuits 226 and 228 and by trigger circuit 230. The circuit 224 produces essentially three signals, coinciding in time with the basic pulse, the sine pulse and the cosine pulse. In addition it produces a gate from the cosine pulse which cuts off the entire circuit immediately after that pulse has passed through, thus forming a closed circle of operation from which only three scan synchronization signals are taken, and closed against extraneous signals.

The sine voltage circuit 226 receives from the sequence gating circuit 224 two signals, one coinciding with the basic pulse and the other with the sine pulse. From these two signals it produces a sinusoidal voltage which is proportional at all times to the sine of the azimuth angle of the scanning antenna. The cosine voltage circuit 228 receives a sine pulse signal and a cosine pulse signal, also originating in the sequence gating circuit, and from these produces a sinusoidal voltage which is proportional at all times to the cosine of the azimuth angle.

The sine and cosine output circuits 232 and 234 receive respectively the sine and cosine voltages from the sine and cosine voltage circuits 226 and 228. In the output circuits, these voltages are used to produce amplitude modulation envelopes on a 60-cycle carrier signal. The output of the sine output circuit 232 is a 60-cycle signal, amplitude modulated by the sine of the azimuth angle, while that of the cosine output circuit 234 is a 60-cycle signal, amplitude modulated by the cosine of the azimuth angle.

These outputs are sent to a control transformer 236 forming a servo loop with a two phase motor 238 and servo amplifier 240. The motor through shaft 242 turns gears 244 and a 3 coil synchro generator 246, which in turn feeds the synchros for one or more indicators 248. Thus the low power two-phase 60-cycle information is converted to high power standard three-phase synchro information which is delivered to the shipboard indicators.

The control transformer 236 is a two-phase synchro in which the rotor has a single winding while the stator has two separate windings 90° apart. The application of the sine and cosine modulated 60-cycle synchro information to the stator windings results in a field which rotates with the radar antenna. When the rotor does not follow, an error voltage is generated which, after being amplified in amplifier 240, is applied to one of the two stator windings of the two-phase motor 238. The other winding of the motor is excited by the reference 60-cycle alternating current, supplied with a phase shift of 90°. As a result, the motor 238 is driven in that direction which will reduce the error voltage to zero. The generator 246 is a three-phase synchro in which the motor is excited with 110 volt 60-cycle single-phase voltage. The stator, though wound three-phase has voltages in phase but with amplitudes which are different and which depend on the position of the rotor. The stator voltages are fed to the servo systems used for controlling the rotation of the sweep coils of the indicators 248.

The trigger circuit 230 generates triggers synchronized with the transmitter pulse for use in the main P. P. I. and any remote indicators.

*The sequence gating circuit*

Figure 3:
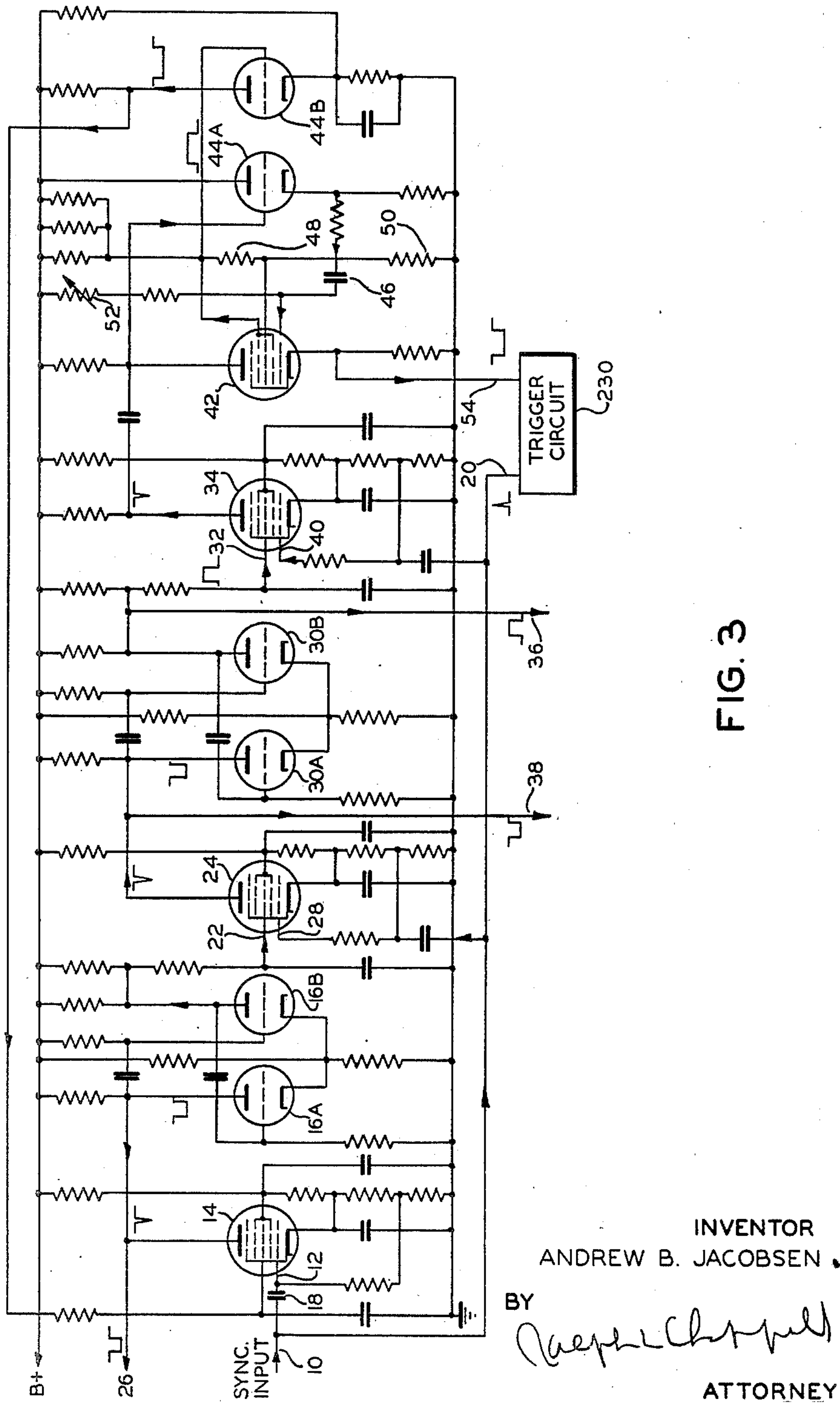
Fig. 3 is a wiring diagram for the sequence gating circuit shown in Fig. 2.

The sequence gating circuit of box 224 in Fig. 2 is shown in Fig. 3. The purpose of this circuit is to provide from the sync pulses a series of triggers to the blocking oscillators and gates to the linear delays in the sine and cosine voltage circuits, and to form a closed "circle" of gates excluding signals other than the sync pulses from which these triggers are derived.

The input at 10 to the first grid (pin 12) of the gated amplifier 14 is the set of four positive sync pulses (basic, sine, cosine, and transmitter), the basic pulse marking the start of the operation cycle. At the start of each cycle, tube 14 is in a receptive state, which lasts through the period of time occupied by the basic pulse, the sine pulse and the cosine pulse in sequence. At the end of that time, tube 14 is cut off by a negative gate derived from the cosine pulse in a manner to be described later. The output from the plate of tube 14 is therefore a set of three negative triggers corresponding to the basic pulse, the sine pulse and the cosine pulse. These are applied to the grid of tube 16B. It will be noticed that this does not include the transmitter pulse, which occurs after tube 14 has been cut off. The original set of four pulses, containing the transmitter pulse, is tapped off ahead of condenser 18 in the grid of tube 14 and sent to a gated amplifier tube in the trigger circuit 230 by way of lead 20. This tube is cut off except during the brief interval in which the transmitter pulse will occur. The trigger circuit 230 contains means to generate a 30 microsecond gate for this purpose.

A 600 microsecond gate is generated by a multivibrator tube 16. The second half (16B) of this multivibrator is normally conducting, and tube current holds the cathode of 16A sufficiently high to cut off tube 16A. The first of the negative signals applied to the grid of tube 16B, in time sequence, is the basic pulse. This cuts off tube 16B, and the resulting positive signal on the plate goes to the grid of tube 16A and turns on that half of the tube. The grid of tube 16B recovers from below cutoff at the end of, say 600 microseconds, completing the multivibrator cycle. The positive gate from the plate of tube 16B is applied to the second grid 22 of tube 24, permitting that amplifier to conduct for 600 microseconds following the occurrence of the basic pulse. The negative gate from the plate of tube 16A is sent by way of lead 26 to a switching tube shown in Fig. 4. The leading edge of this gate coincides with the basic pulse, so that the increasing voltage sweep of the sine linear delay starts with the basic pulse.

The input signal to the first grid 28 of gated amplifier tube 24 is also the set of four positive sync pulses. The tube is cut off however, by positive cathode bias, except during the presence of the 600-microsecond gate from tube 16B applied to its second grid. Since this gate starts with the occurrence of the basic pulse, the first signal to be passed and amplified by tube 24 will be the sine pulse. The output from the plate of the tube is a negative trigger, and is applied to the grid of tube 30B.

Another 600 microsecond gate is generated in another multivibrator tube 30. This is again a simple multivibrator, operating in exactly the same way as tube 16. It is triggered by the first of the negative signals arriving on the grid of tube 30B from the plate of tube 24. Since this signal corresponds to the sine pulse, the leading edges of the output gates from tube 30 occur at a time coinciding with the sine pulse. The positive gate from the plate of tube 30B is applied to the second grid 32 of tube 34, opening that tube for 600 microseconds after the occurrence of the sine pulse. The positive gate is also sent by lead 36 to a blocking oscillator in the sine voltage circuit, where its differentiated leading edge triggers the oscillator in time with the sine pulse. The negative gate from plate of tube 30A is sent by lead 38 to a switching tube of a linear delay circuit in the cosine voltage circuit, so that the increasing voltage sweep of the cosine linear delay starts with the sine pulse.

The input signals to the first grid 40 of gated amplifier tube 34 is also the set of four positive sync pulses. The tube is cut off however by positive cathode bias, except during the presence of the positive 600-microsecond gate from tube 30B applied to its second grid 32. Since this gate starts with the occurrence of the sine pulse, the first signal to be passed and amplified by tube 34 will be the cosine pulse. The output from the plate of tube 34 is a negative trigger coincident with the cosine pulse, and this is applied to the grid of the cathode follower 44A, in the 2500-microsecond phantastron gate circuit to be described next.

This employs tubes 42 and 44. A pentagrid tube of the type commercially designated 6SA7 is chosen for this circuit because it has two control grids (first and third) each of which can control the space current. In the quiescent state, tube 44A is conducting and capacitor 46 is charged to about 375 volts minus the potential of the cathode of tube 42; while the cathode, and first and second grids of the tube 42 are acting as a triode, with all the space current going to the second grid acting as the anode. The third grid, in a voltage divider between B-plus and ground, is held at a potential determined by the current through the voltage divider, and this voltage is decreased by the space current flowing to the second grid. In the quiescent state, the potential of the third grid is low enough to keep any space current from reaching the actual plate of the tube.

The gate action is initiated by the negative trigger from tube 34, coinciding in time with the cosine pulse. This signal is applied through the cathode follower tube 44A to the first control grid of tube 42, and reduces the space current flowing to the second grid. This results in a voltage rise at the junction of resistors 48 and 50 to which the third grid is connected. The potential of the third grid therefore goes up, some space current begins to flow to the plate, and the cathode level drops. The plate current is small in comparison with the current to the second or screen grid, but because of the large resistance in the plate circuit, small changes in plate current produce relatively large changes in plate voltage. The drop in plate voltage is fed back through tube 44A to the first grid of the tube 42, and the plate continues to drop until further decrease of screen current cannot increase plate current through raising the potential of the third grid. At this stage both sides of capacitor 46 have been driven considerably below their normal potential, which is near B-plus, and the capacitor begins to charge through resistor 52. The RC of this circuit determines the moment at which the first grid will rise high enough to permit the screen current to increase again, and at that time the third grid again drops, cutting off plate current and terminating the gate. The width of the gate is controlled by the setting of resistor 52.

The positive square wave from the screen of tube 42 is amplified and inverted by the amplifier tube 44B, and used to gate off tube 14 for 2500 microseconds after the occurrence of the cosine pulse, as was stated briefly and without further explanation in the discussion of tube 14. The negative gate from the cathode of tube 42 goes by a lead 54 to a circuit where its differentiated leading edge, occurring at the time of the cosine pulse, is used to trigger a 35-microsecond phantastron gate.

*The sine (and cosine) voltage circuits*

Figure 4:
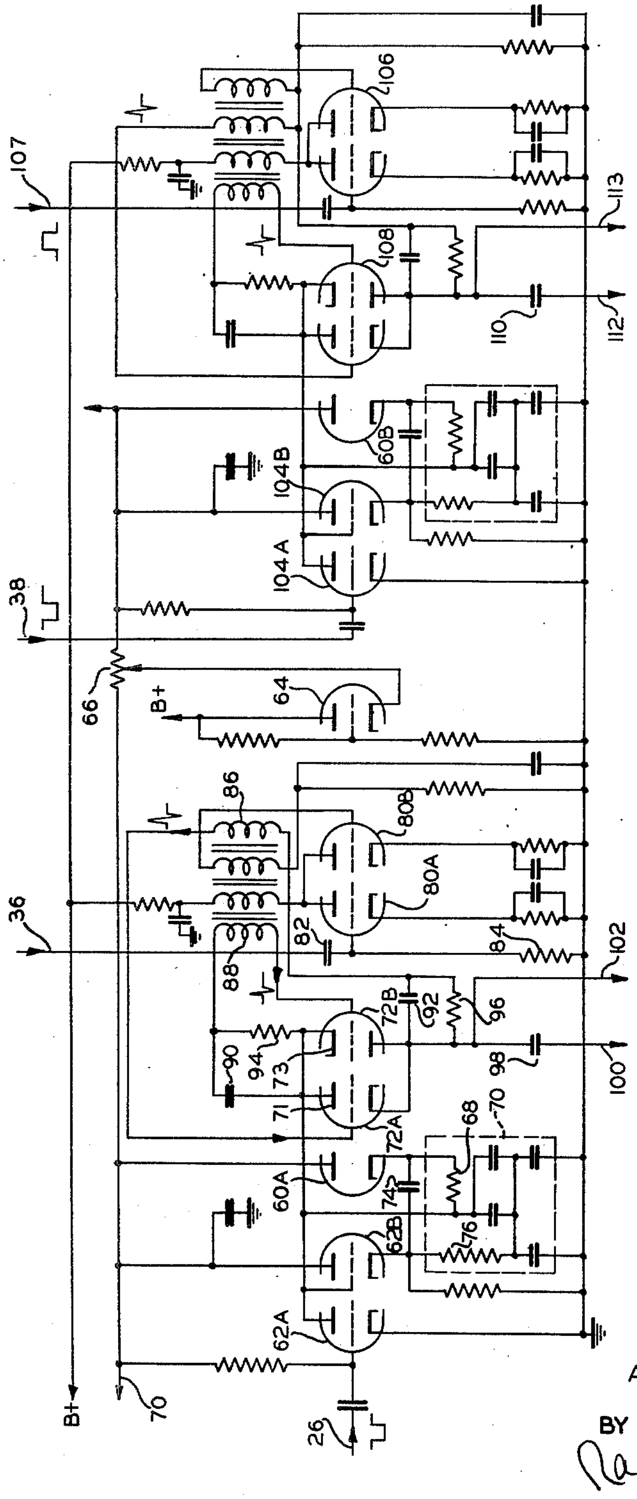
Fig. 4 is a wiring diagram for the sine (or cosine) voltage circuit shown in Fig. 2.

The sine and cosine voltage circuits (226 and 228 in Fig. 2) are identical in operation, and are shown in detail in Fig. 4. Their purpose is to convert the time intervals defined by the set of three sync pulses (basic pulse, sine and cosine pulse), into a pair of sinusoidal voltages, 90° out of phase, whose period is the same as the rotation period of the radar antenna in the aircraft. These voltages are then used to modulate a 60-cycle carrier, and the resulting amplitude-modulated 60-cycle voltages are sent to the synchro converter and ultimately control the rotation of the P. P. I. deflection coils, synchronizing the azimuth position of the P. P. I. sweeps with the azimuth position of the radar beam.

The basic pulse generates a 600-microsecond gate from tube 16 (Fig. 3), while the sine pulse generates a similar gate from tube 30, as has already been described in the paragraph on the sequence gating circuit. The leading edges of these gates coincide in time with the basic pulse and the sine pulse respectively, so the varying time interval separating the leading edges of the gates also defines the sine of the azimuth angle of the radar beam. The leading edges of these two gates are used, in the sine voltage circuit, to produce a sinusoidal voltage whose amplitude at any moment is proportional to the sine of the azimuth angle. This is the output of the sine voltage circuit. Similarly, the cosine pulse generates a 2500-microsecond gate from tube 42, also previously described in connection with the sequence gating circuit; and the varying time interval between the leading edges of the (sine) 600-microsecond gate from tube 30 and the (cosine) 2500-microsecond gate from tube 42 similarly defines the cosine of the azimuth angle. The leading edges of these two gates are used, in the cosine voltage circuit, to produce a sinusoidal voltage whose amplitude at any moment is proportional to the cosine of the azimuth angle. This is the output of the cosine voltage circuit.

Figure 7:
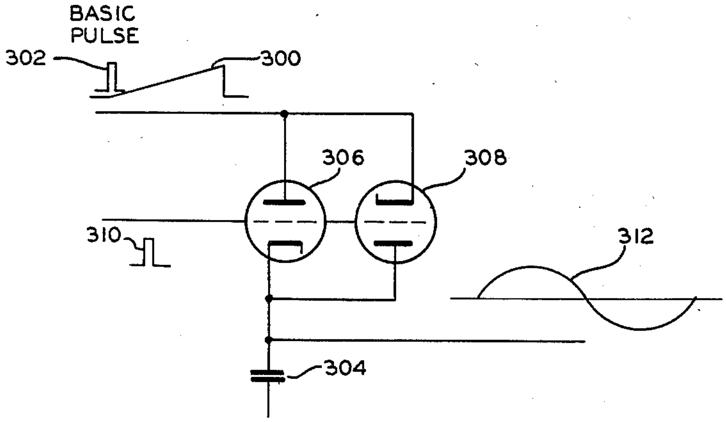
Fig. 7 is explanatory of the circuit shown in Fig. 4.

For a brief preliminary explanation reference is made to Fig. 7, in which it will be seen that a linear sawtooth wave 300, triggered on the occurrence of the basic pulse 302, is supplied to an output capacitor 304, which is intended to be cumulatively charged, at intervals, by an instantaneous potential of the sawtooth wave 300. This charging action is controlled by a pair of oppositely-poled normally-nonconductive switch tubes 306 and 308. Means (such as a blocking oscillator) triggered by the sine pulse 310, is used to apply to the control electrodes of the switching tubes such a potential as will make the same momentarily conductive, and the then existing potential of the sawtooth wave is applied to the output capacitor 304. The potential across the capacitor will be an alternating potential, indicated at 312, which follows the position modulation of the sine pulse 310 relative to the basic pulse 302.

The detailed circuit operation will now be described with reference to Fig. 4. The leads 26, 36, and 38 at the bottom of Fig. 3 connect to the correspondingly numbered leads at the top of Fig. 4. The sine linear delay circuit comprises tubes 60 and 62 and is a sawtooth generator of the "bootstrap" type, and is quite linear. B-plus voltage is supplied to plate of tube 62B and to the plate of tube 60 through a regulator triode 64 and the slope adjustment potentiometer 66. The basic B-plus supply (375 volts) is closely regulated but the triode 64 provides a low impedance source at a suitable voltage applied to the slope potentiometer. The slope adjustment potentiometer 66 provides a way of balancing the B-plus voltage distributed to the sine and cosine voltage linear delay circuit and double clamps, and thus equalizes the slopes of the resulting sine and cosine voltage outputs. The operation of the sine linear delay circuit is as follows.

Before the action starts, tubes 60 and 62 are strongly conducting. The voltage on the plate of tube 62A is actually derived from the cathode of tube 60 through the resistor 68 in network 70; and since tube 62A is operating at zero bias, most of the B-plus drop in across this resistor. When the basic pulse occurs, the leading edge of the negative 600-microsecond gate from lead 26, coinciding in time with the basic pulse, is applied to the grid of tube 62A and cuts off that tube. The capacitors in network 70 thereupon begin to charge through tube 60 and the resistor 68, but the charging wave is fed back through the cathode follower 62B to the cathode of tube 60. Therefore the voltage on the cathode of tube 60 rises parallel to the charging wave, so that the voltage drop across the resistor 68 is reasonably constant. Thus the charging current, which is the current through the resistor 68, is also constant, and the capacitors in network 70 acquire charge at a constant rate. The linear increasing voltage appearing at the plate of tube 62A is the sine linear delay, and is applied to plate 71 of tube 72A and cathode 73 of tube 72B. This tube is a sine double clamp. The linearity of the delay sweep is improved by an integrating circuit made up of capacitor 74 and resistor 76, and is very good for the first 350 microseconds of the sweep, which is sufficient for the purposes of the circuit. The sweep is terminated by the positive trailing edge of the gate from tube 16, which turns on tube 62A and causes the capacitors in network 70 to discharge.

There is a sine blocking oscillator, using tube 80. This receives on the grid of tube 80A the positive 600-microsecond gate on lead 36 from tube 30B. The leading edge of this gate coincides in time with the sine pulse, and is differentiated by capacitor 82 and resistor 84, providing a positive trigger to the first half of the blocking oscillator. There are two outputs from the blocking oscillator, in time with the sine pulse. One is taken from coil 86, and is applied across grid and cathode of the sine double clamp tube 72A. The second is taken from coil 88, and is applied across the grid and cathode of tube 72B. The polarity of these transformer connections to tube 72 is such that the output signal from the sine blocking oscillator drives the grids of the sine double clamp in the positive direction and the cathodes in the negative direction.

One input to tube 72 is the sine linear delay, starting in time with the basic pulse and applied to the plate 71 and the cathode 73 of tube 72. The other is the signal from the sine blocking oscillator, occurring in time with the sine pulse and applied across the grid and cathode of each half of the double clamp tube 72. Driving the grids up and the cathode down, this "sine pulse" from the blocking oscillator may be thought of as a switching signal for the double clamp. When it occurs, grid current will flow in both halves of the double clamp and the capacitors 90 and 92 will charge to the peak value of the switching signal. As the switching signal terminates, each half of the double clamp is held cut off by the charge on the corresponding one of these two capacitors; and in the interval between the switching "sine pulses," this charge leaks off the capacitors only very slightly through the resistors 94 and 96. Although small, this leakage is enough to permit the next switching signal to drive each grid again positive with respect to its cathode, and each half of the double clamp again is free to conduct for a brief instant at the peak of the switching signal.

With the sine linear delay applied to plate 71 and cathode 73, the two halves of the double clamp 72 function essentially as grid bias detectors, with capacitor 98 as their load. The lower side of capacitor 98 is connected by lead 100 to a constant positive potential supplied through a sine zero potentiometer (162 in Fig. 5) which will be described later in connection with the sine output circuit in Fig. 5, and at the beginning of operation this capacitor 98 is uncharged. To follow the operation of the double clamp, assume that the sine of the azimuth angle of the radar beam is increasing, so that in each repetition cycle the sine pulse occurs at successively later times with reference to the basic pulse. When the "sine pulse" switching signal from the blocking oscillator turns on both halves of the double clamp, the increasing voltage of the sine linear delay will have raised the plate of tube 72A to a potential higher than the cathode level set by capacitor 98. Tube 72A therefore conducts for an instant, and the potential of capacitor 98 is raised to the level the linear delay has at the time the sine pulse arrives. After the switching signal ends, the charge now acquired by capacitor 98 cannot escape because both halves of the double clamp are cut off as described above. When the next sine pulse occurs, slightly later in time relative to the start of the next linear delay sweep, the corresponding switching signal from tube 80 will turn on both halves of tube 72 at a time when the linear delay has carried the plate of tube 72A slightly higher than the cathode level set by the new potential on capacitor 98. Tube 72A will therefore conduct again, and the potential of capacitor 98 will increase still further.

This process continues until the sine of the azimuth angle reaches its greatest value, which occurs when the radar beam has an azimuth bearing of 90° to true north. At this point the potential of capacitor 98 will have reached a maximum value, corresponding to the height of the sine linear delay voltage at the latest moment of occurrence of the sine pulse relative to the basic pulse which starts the linear delay. After this point, with continuing azimuth rotation, the sine of the azimuth angle begins to decrease, and the sine pulse itself begins to occur at shorter and shorter intervals after the start of the sine linear delay. When the "sine pulse" switching signal from tube 80 now turns on both halves of tube 72, the sine linear delay will have carried plate 71 and cathode 73 to a level not quite as high as the level of the opposite cathode and plate of tube 72 established by the potential of capacitor 98. Tube 72B therefore conducts and the potential of capacitor 98 is pulled down to the level the linear delay has at the time the sine pulse occurs. The next sine pulse will occur at a time still closer to the start of the linear delay, at a point where the magnitude of the delay voltage is still smaller, and the corresponding switching signal will cause tube 72B to conduct again and the potential of capacitor 98 will drop still further. This process continues, with tube 72B doing the conducting, until the sine of the azimuth angle has reached its smallest value, which occurs when the radar beam has an azimuth bearing of 270° to true north. At this point, the potential of capacitor 98 will have reached a minimum value, corresponding to the height of the sine linear delay voltage at the earliest moment of occurrence of the sine pulse relative to the basic pulse which starts the linear delay. After this point, with continuing azimuth rotation, the sine of the azimuth angle begins to increase again, the sine pulse occurs at longer and longer intervals after the start of the linear delay, and tube 72A takes up the conduction, lifting the potential of capacitor 98.

Since the delay voltage increases linearly, that is, by equal amounts in equal intervals of time, and since the time interval separating the sine pulse from the start of the linear delay is always proportional to the sine of the azimuth angle, the potential of capacitor 98 also varies sinusoidally and is proportional to the sine of the azimuth angle. This "sine voltage" is the output of the present circuit, and it duplicates the sine voltage generated in the synchronizer from which the sine pulse is itself derived. The sine voltage from capacitor 98 is sent on lead 102 to the grid of a sine comparator tube in a sine output circuit, to be described in connection with Fig. 5.

The cosine linear delay circuit employs tubes 104 and 60B, and operates in precisely the same way as the sine linear delay just described. Its trigger is the differentiated leading edge of the negative 600-microsecond gate from tube 30A on lead 38, coinciding in time with the sine pulse. The cosine linear delay voltage sweep therefore starts at the time of the sine pulse. The cosine blocking oscillator tube 106 operates in precisely the same manner as the sine blocking oscillator just described, applying a sharp switching signal between the grids and cathodes of both halves of the cosine double clamp tube 108. The trigger to the cosine blocking oscillator is the differentiated leading edge of a positive 35-microsecond gate supplied on lead 107 from a phanatastron circuit in the trigger circuit 230 (Fig. 2). The leading edge of this gate occurs in time with the cosine pulse, so the switching signal applied by the cosine blocking oscillator to the cosine double clamp also coincides with the cosine pulse. The similarity of this arrangement to the sine linear delay and blocking oscillator is evident. The cosine linear delay starts with the sine pulse, and the switching signal applied to the cosine double clamp occurs in time with the cosine pulse, so that the series of voltage levels reached by the cosine linear delay at the occurrence of each switching signal follows the variation of the time interval from the sine pulse to the cosine pulse. This time interval is always proportional to the cosine of the azimuth angle.

The cosine double clamp tube 108, is similar in operation to the sine double clamp, operating as a grid bias detector with capacitor 110 as its load. The D. C. level of capacitor 110 is established through lead 112 to a cosine zero potentiometer, not shown, but like the sine zero potentiometer. Through the operation of the double clamp, this capacitor is charged and discharged in a way similar to that already described for capacitor 98 in the sine voltage circuit. The potential of the tube side of capacitor 110 thus varies sinusoidally, and is proportional to the cosine of the azimuth angle. This "cosine voltage" duplicates the cosine voltage generated in the synchronizer, from which the cosine pulse is derived; and it is sent by lead 113 to the grid of a cosine comparator tube in a cosine output circuit, not shown, but like the sine output circuit.

*The sine (and cosine) output circuit*

Figure 5:
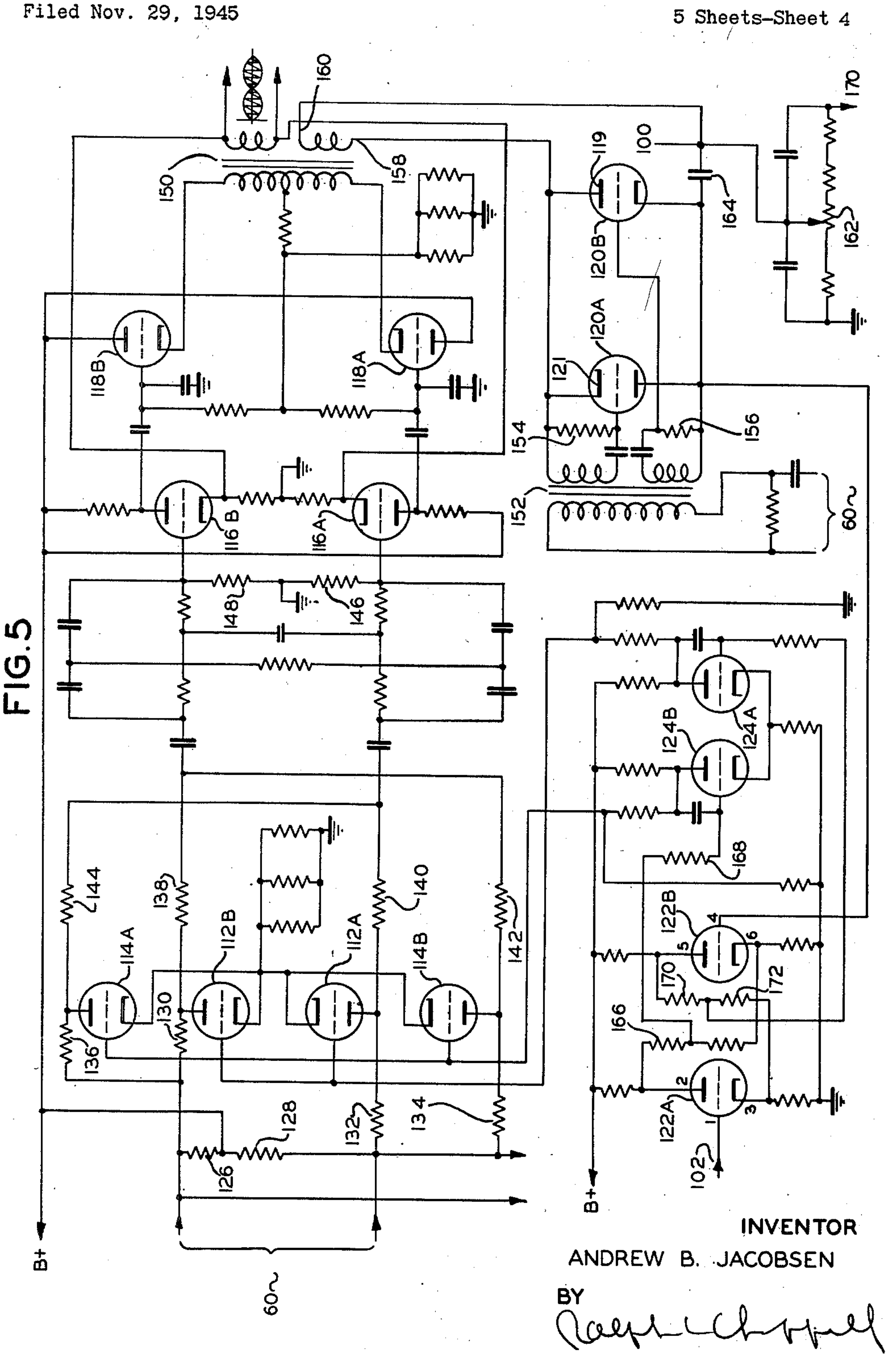
Fig. 5 is a wiring diagram for the sine (or cosine) output circuit shown in Fig. 2.

The sine output circuit is shown in Fig. 5, and provides a 60-cycle excitation signal, amplitude-modulated by the sine of the azimuth angle of the radar beam, to one of the stator windings of the control transformer 236 (Fig. 2). The cosine output circuit provides a similar excitation signal to the other stator winding of the same control transformer, and the output from the rotor is then used to rotate the deflection yokes of the shipboard P. P. I.'s, synchronizing the azimuth position of the P. P. I. sweeps with the azimuth of the scanning radar beam. The sine output circuit and the cosine output circuit being identical, only the sine output circuit will be discussed in detail in the following paragraphs.

The stages comprising the sine output circuit in Fig. 5 are as follows: the modulator tubes 112, 114; the modulation amplifier tube 116; the driver tube 118; the double clamp tube 120; the comparator tube 122; and the differential amplifier tube 124. The output of the entire circuit, taken from a secondary of the output transformer following the driver, is a 60-cycle voltage amplitude-modulated by the sine of the azimuth angle and having a phase reversal of the 60-cycle carrier at the point where the sine envelope passes through zero amplitude. This is accomplished basically by the modulator portion of the circuit, whose output is simply amplified and converted to a push-pull signal through the driver for application to the output transformer. Actually, the comparator stands at the logical beginning of the circuit; but because of a circularity in the sequence of actions to be described, the discussion will be clearer if the modulator itself is described first. This modulator, although believed novel, is not claimed herein, it being disclosed and claimed in my copending application Serial No. 631,747 filed November 29, 1945, Patent No. 2,591,821 dated April 8, 1952.

Figure 6:
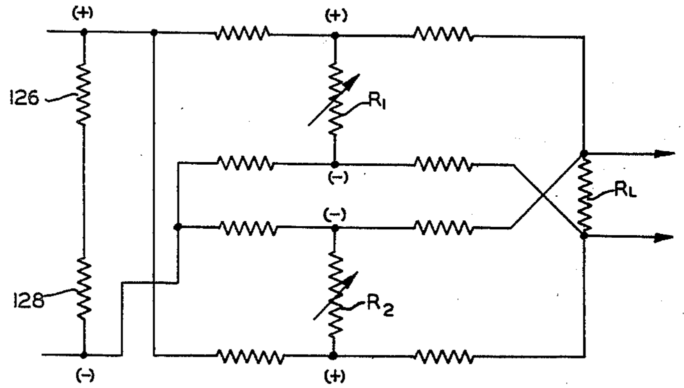
Fig. 6 is a diagram showing an equivalent circuit equivalent to the modulator forming a part of the sine output circuit shown in Fig. 5.

The modulator portion of the sine output circuit can be reduced to the equivalent circuit shown in Figure 6. In the equivalent circuit, the tubes have been replaced by variable resistors, because the tubes in the modulator act as resistances, with values depending on the grid bias. $R_1$ represents tube 112, and $R_2$ for tube 114; and all resistances other than these two are equal. The 60-cycle carrier signal to be modulated, is applied across the series resistors, 126 and 128, as shown, and is obtained from the synchro converter. The output load of the modulator is represented by $R_L$.

From the equivalent circuit drawn in this way, it is evident that there are two parallel branches or sections of the modulator, each section being shunted by one of the variable resistors (tubes), and each section contributing to the voltage applied across the load. A moment's study of the connections, with reference to any chosen polarity of the input 60-cycle carrier across resistors 126 and 128, will show that the contribution made by one section to the load $R_L$ will always be opposite in phase to the contribution made by the other section. Consequently, the polarity of the resultant voltage across the load at any moment will be determined by which of these two contributions is the larger at that moment; and if the two contributions are equal, their phase opposition will produce a net voltage of zero across the load.

For example, assume to begin with that $R_1$ and $R_2$ are equal. Then $E_1$ and $E_2$ will also be equal; but as applied across $R_L$ they are opposite in phase, and will therefore cancel, producing zero net voltage across the load $R_L$. Suppose that either $R_1$ increases slightly or $R_2$ decreases slightly, $E_1$ will now be slightly larger than $E_2$, and the resultant voltage across $R_L$ will be equal in magnitude to the difference between these two voltages and will have the polarity of $E_1$. On the other hand, if $R_1$ decreases slightly and $R_2$ increases slightly $E_1$ will now be smaller than $E_2$, and the resultant voltage across $R_L$ will still be equal in magnitude to the difference between these two but will have the polarity of $E_2$.

Evidently, from the above remarks, the existence of a resultant voltage across the load depends on the existence of a difference in the values of the shunting resistors; and for a given polarity of the input 60-cycle signal, the polarity of the output voltage across $R_L$ depends on which of these two resistors is the larger. Furthermore, since the current-voltage relation in a resistive circuit is linear, the output voltage across $R_L$ is proportional to the difference between $R_1$ and $R_2$. Therefore if the difference between $R_1$ and $R_2$ varies sinusoidally, the output 60-cycle signal across the load will be amplitude-modulated in a sinusoidal fashion. This is precisely what happens in the operation of the actual circuit. The tubes which have been represented in the above by the two variable resistors, are controlled by sinusoidal "push-pull" grid bias voltages, 180° out of phase, and the operating portion of the tube characteristics is sufficiently linear to make the resistance of each tube vary sinusoidally with its grid bias voltage.

In the actual circuit, the modulator tubes are two double triodes, 112 and 114 (Fig. 5). The plate circuits of each of these tubes are fed in phase opposition by the 60-cycle input signal across resistors 126 and 128, through resistors 130, 132, 134 and 136. This input signal is the carrier, to be modulated by the action of the circuit. The outputs of the tubes, taken also from the plate circuits, are fed through resistors 138, 140, 142 and 144 into a 120-cycle rejection filter which removes signals of this frequency generated to the modulator by the non-linear elements. Tube 112 and its input and output plate circuits form one section of the modulator, while tube 114 with its plate circuits forms the other. The output of each section is grid controlled, being smaller for increasing positive grid voltages and larger for decreasing grid voltages. Since the carriers of the outputs of the two sections are 180° out of phase, the resultant voltage appearing across the load at any time depends on the difference between the contributions of the two sections at that time. The polarity of the resultant voltage will be the polarity of the stronger of the two contributing voltages, and the amplitude of the resultant will be proportional to the difference of their amplitudes. This difference in turn depends on the difference between the grid bias of tube 112 and the grid bias of tube 114.

The grid bias for both halves of tube 112 is obtained from the plate of tube 124A, while the grid bias for both halves of tube 114 is obtained from the plate of tube 124B. The action of the differential amplifier, tube 124, will be explained in detail later. At this point it is enough to state only that the plate output of each half of tube 124 is a voltage proportional to the sine of the azimuth angle, and that these two voltages are 180° out of phase, being equal only when the sine of the azimuth angle is zero. Their difference is therefore also proportional to the sine of the azimuth angle, and this difference is what determines the amplitude of the modulation envelope of the 60-cycle output of the modulator. That output is thus seen to be a 60-cycle signal, amplitude-modulated by the sine of the azimuth angle. Its amplitude is zero when the sine of the azimuth angle is zero, that is, when the radar beam is aimed either directly north or directly south. At these zero points, furthermore, the predominance of the contributing signal from one section of the modulator over that from the other reverses, and there is a resulting phase-reversal of the 60-cycle carrier itself. This output is fed through the 120-cycle rejection filter into the amplifier.

The amplifier is a double triode connected with the two halves in push-pull arrangement. The input signal from the modulator is applied to the two grids of tube 116 across resistors 146 and 148, and drives one grid positive when the other is driven in the negative direction. The two outputs are applied to the grids of the driver stage, tube 118, which is a push-pull cathode-follower circuit with the output transformer 150 connected between the two cathodes. The output transformer secondary consists of two separate windings. One winding is a low impedance step-down from the primary, and provides the output to the resolver in the synchro converter and also an inverse feedback signal to the cathode of each half of amplifier tube 116. The cathode follower driver stage, with the low impedance output winding of the transformer and with inverse feedback to the amplifier, provides a low impedance output source to minimize phase shift with variations in output loading. The other secondary of the output transformer provides the input sine signal to the double clamp, tube 120, and is an impedance step-up from the primary to supply the necessary voltage amplitude for this circuit.

This double clamp tube 120 is similar to the one (tube 72) already described in connection with the sine voltage circuit. Its function is to de-modulate the output of the driver, obtaining a single sine wave from the double sine-wave envelope of the output signal, and to feed this single sine wave into the comparator tube 122.

The double-clamp switching voltage is a 115-volt 60-cycle signal obtained through transformer 152 from the synchro converter, and this signal is in fact identical (except for the difference in amplitude) with the carrier signal fed into the modulator circuit described above. It is applied between grid and cathode of each half of the double clamp. The charge acquired by the grid capacitors leaks off only very slowly, through the resistors 154, 156 between the positive peaks of the switching signal, and holds both halves of the tube cut off except for a brief interval at each positive peak of the switching signal. The sine output of the driver, from terminal 158 of the output transformer secondary, is applied to plate 119 and cathode 121 of the double clamp; while the opposite terminal 160 of the same secondary winding is connected to the arm of the sine zero potentiometer 162 which establishes the potential of one side of capacitor 164. The other side of capacitor 164 is connected to the other plate and cathode of the double clamp tube 120.

The switching voltage applied to the grids and cathodes of the double clamp is the same 60-cycle signal that serves as the carrier of the sine output from the modulator and driver, except that the carrier of the sine output experiences a reversal of phase at the zero points of the sine envelope. Evidently the switching voltage and the carrier of the sine output will be exactly in phase over one half-cycle of the sine output modulation envelope, and 180° out of phase over the next half-cycle. Since the two halves of the double clamp can conduct only at the positive peaks of the switching signal, it is therefore also evident that over one half-cycle of the sine envelope, this conduction will occur at the positive peaks of the sine output carrier, while over the next half-cycle, the conduction will occur at the negative peaks of the carrier. The action of the double clamp is then briefly as follows. During the first quarter-cycle of the sine envelope, when the switching signal and the sine output carrier are in phase, each successive peak of the carrier lifts the plate of tube 120B slightly above the voltage at which its cathode is held by the charge on capacitor 164. This half of the double clamp therefore conducts, capacitor 164 acquires more charge, and the voltage of the tube side of this capacitor rises in step-by-step fashion, following the envelope of the sine output, until that envelope has reached its maximum amplitude.

At this point, the successive peaks of the sine output carrier begin to decrease in amplitude. Since the voltage on the plate of tube 120A, due to the charge on capacitor 164, is now higher than the voltage of each succeeding positive peak of the sine carrier applied to the cathode of tube 120A, that half of the double clamp now conducts and capacitor 164 begins to discharge through it. The potential of the tube side of the capacitor therefore drops, still following the envelope of the sine output carrier. When the sine envelope reaches its zero point, the phase reversal of the carrier makes its negative peaks coincide with the positive peaks of the switching signal, so that conduction can now only occur on the negative peaks of the carrier as pointed out above. Therefore tube 120A continues to do the conducting and charges capacitor 164 in the opposite direction, each succeeding negative peak of the carrier dropping the potential of the tube side of capacitor 164 still further, to follow the descending curve of the sine envelope to its lowest point. Here, at the start of the fourth quarter-cycle of the sine envelope, the successive negative peaks of the carrier start decreasing in amplitude. While conduction can still only occur on these negative peaks. Since the potential, at which plate of tube 120A and cathode tube 120B are held by the charge of capacitor 164, is now lower than the level reached by the successive negative peaks of the carrier, tube 120B takes up the conduction again and capacitor 164 discharges through it, the potential of the tube side of the capacitor rising to follow the sine envelope back to the zero point. When this is reached, the cycle of operation of the double clamp is complete and starts again in precisely similar fashion. The output of the double clamp is the potential of the tube side of capacitor 164, and is a complete six-cycle per minute sine wave for the normal scan rate of the radar antenna in the plane. It is applied to grid of the comparator, tube 124B, on a D.-C. base established by setting the sine zero potentiometer 162.

The double clamp, tube 120, operates satisfactorily only because the phase relation between the switching voltage and the carrier of the "feedback" sine output is closely maintained. Thit is, the two 60-cycle signals are meant to be exactly in phase over one half of the sine output cycle, and exactly 180° out of phase over the other half of the cylce. There are, however, slight inherent phase shifts of one with respect to the other, introduced by reactive elements of the various circuits concerned. For proper behavior of the sine and cosine output circuits, these phase shifts must be held to a minimum.

There is a comparator stage in the sine output circuit, using tube 122, the function of which is to compare the sine potential derived from the sine double clamp, tube 72 (Fig. 4), with the sine potential derived from the double clamp, tube 120, described immediately above, and to obtain from this comaprison a pair of voltages which are then fed to the differential amplifier, tube 124. From the two plates of the differential amplifier, these voltages are applied as push-pull signals to the grids of the modulator tubes, 112 and 114, where their difference produces the sine modulation of the 60-cycle carrier as described in the paragraph on the modulator circuit itself.

The following simple analysis will explain the action of the comparator. First, it is apparent that the two halves of this double triode are connected in a completely symmetrical circuit. Plate and cathode resistors are equal, and the plate load of each triode is split, half being on the plate side of that triode and half on the cathode side of the other triode. The two inputs are applied to the grids, the grid of tube 122A receiving the sine potential from the double clamp, tube 72, and the grid of tube 122B receiving the "feedback" sine potential from the double clamp, tube 120. These input sine voltages are exactly in phase, but slightly different in amplitude and they have the same average D. C. level, beacuse the sine zero potentiometer arm is connected to both capacitor 164 in the double clamp, tube 120, and capacitor 98 in the double clamp, tube 72. In this way the two halves of the comparator are balanced, and both sections operate about the same operating point. Furthermore, since the plate and cathode loads of each half of the comparator are equal, each triode operates simply as an inverter with a gain of unity, the plate and cathode signals being equal but opposite in polarity.

The sinusoidal input to the grid of tube 122A is a voltage of the form $A \sin \phi$, where A is the maximum amplitude of the input signal and $\phi$ is the azimuth angle. Similarly, the sinusoidal input to the grid of tube 122B can be represented by $B \sin \phi$, where B is the maximum amplitude of that input signal and is different from A. We can now write formulas for the voltage at each plate and cathode in terms of the input voltages to the grids. Let P2 be the voltage at the plate having that pin number, and P5, C3, and C6 be the voltages at the other plate and the corresponding cathodes. Then:

$$P2=-A \sin \phi;\ P5=-B \sin \phi;$$

$$C3=A \sin \phi;\ C6=B \sin \phi$$

There are two output signals from the comparator. One, which will be labeled X, is the voltage at the point between resistors 166 and 168; and the other, which will be labeled Y, is the voltage at the point between resistors 170 and 172. The voltage X is evidently the algebraic sum of the voltages at plate 2 and cathode 6 of tube 122, while Y is the algebraic sum of the voltages at plate 5 and cathode 3 of tube 122. Using the above simple formulas, we get: $X=B \sin \phi-A \sin \phi$; and $Y=A \sin \phi-B \sin \phi$ or $$X=(B-A)\sin \phi;\ \text{and}\ Y=(A-B)\sin \phi$$

That is, $X=-Y$.

Evidently X and Y are opposite in phase and equal in amplitude both being proportional to the sine of the azimuth angle. X is fed to the grid of tube 124B, while Y goes to the grid of tube 124A.

The double tube 124 is used as a differential amplifier, using a pair of balanced triode amplifiers, with the two push-pull sine voltages X and Y as their grid input signals. The output from the plate of tube 124A is applied to the joined grids of tube 112 in the modulator circuit, while the output from the plate of tube 124B is applied to the joined grids of tube 114 in the modulator circuit. As explained in the discussion of the modulator, the difference between the grid voltages of the two modulator tubes is what produces the sine modulation of the 60-cycle carrier. That difference is proportional to the difference between X and Y, and since these are sine voltages their difference is also proportional to the sine of the azimuth angle. The capacitor and the resistor in the grid circuit of each half of the differential amplifier form a low-pass feed-back circuit, which passes the six-cycle per minute frequency of the sine voltages but blocks out spurious high frequencies generated or picked up in the circuit.

The cosine output circuit is identical in all respects with the sine output circuit described above, every element in the one being duplicated in the other. The inputs to the cosine output circuit are the cosine potential from the double clamp, tube 108, in the cosine voltage circuit (see leads 112, 113 in Fig. 4), the 80-volt 60-cycle signal across resistors 126 and 128 to serve as the carrier of the cosine output, and the 115-volt 60-cycle signal from transformer 152 to serve as the switching voltage on the double clamp.

It is believed that the construction and operation of preferred circuits embodying my invention, as well as the advantages thereof, will be apparent from the foregoing detailed description. It will also be apparent that while I have shown and described my invention in a preferred form, many changes may be made in the circuit elements shown, without departing from the spirit of the invention as sought to be defined in the following claims.

I claim:

1. In a data transmission system in which the transmitter is pulse modulated by a starting pulse, a data pulse and a second data pulse, said data pulses being position modulated relative to said starting pulse, a receiver for said pulses comprising, a first pulse generating circuit responsive to said starting pulse for generating a first voltage square wave having a time duration long enough to overlap said first data pulse, a second pulse generating circuit responsive to time coincidence of said first voltage square wave and said first data pulse to generate a second voltage square wave having a time duration long enough to overlap said second data pulse, a third pulse generating circuit responsive to time coincidence of said second voltage square wave and said second data pulse to generate a third voltage square wave, and means responsive to said third voltage square wave for rendering said first pulse generating circuit unresponsive to input pulses.

2. In an angle data transmission system having a transmitter pulse modulated by a starting pulse, a sine pulse and a cosine pulse, said sine pulse and cosine pulse being position modulated relative to said starting pulse in accordance with the angle to be transmitted, a receiver for said pulses comprising, a first pulse generating circuit responsive to said starting pulse for generating a first voltage square wave having a time duration long enough to overlap said sine pulse, a second pulse generating circuit responsive to time coincidence of said first voltage square wave and said sine pulse for generating a second voltage square wave having a time duration long enough to overlap said cosine pulse, a third pulse generating circuit responsive to time coincidence of said second voltage square wave and said cosine pulse to generate a third voltage square wave, and means responsive to said third voltage square wave for rendering said first pulse generating circuit unresponsive to input pulses.

3. In a data transmission system for producing remote synchronous rotation by means of a pulse modulated radio transmitter wherein the time spacing between individual pulses in a series of pulses indicates the sine and cosine values of the rotational angle, a receiver for said pulses comprising, a sequence gating circuit responsive to said pulses successively for generating a series of voltage square waves each having a time duration long enough to overlap the next succeeding pulse, each of said voltage square waves being produced in response to time coincidence of a transmitted pulse and a voltage wave derived from a preceding transmitted pulse, whereby absence of time coincident pulse and voltage square wave renders said receiver nonresponsive to input pulses.

4. In a radio relay radar system having a relay transmitter arranged to transmit angle data and video data, the angle data including a reference pulse, a sine pulse and a cosine pulse having a time spacing related to the angle being transmitted, the video data including a transmission pulse and echo pulses, a radio relay receiver comprising a sequence gating circuit including a first pulse generating circuit responsive to said reference pulse to generate a first voltage wave having a time duration long enough to overlap the time of occurrence of said sine pulse, a second pulse generating circuit responsive to time coincidence of said first voltage wave and said sine pulse for generating a second voltage wave having a time duration long enough to overlap time of occurrence of said cosine pulse, a third voltage wave generator responsive to time coincidence of said second voltage wave and said cosine pulse for generating a voltage wave having a time duration long enough to overlap the time of occurrence of said transmission pulse and said echo pulses and means responsive to said third voltage wave to render said first pulse generating circuit unresponsive to input pulses.

5. An electrical circuit to convert position data in which the time spacing between a reference pulse and a time modulated pulse represents said position into an alternating potential which follows the time modulation relative to said reference pulse comprising, means responsive to said reference pulse to generate a linear sawtooth wave, an output capacitor adapted to be charged at intervals to the instantaneous potential of said sawtooth wave, a pair of normally nonconductive switch tubes connected between said sawtooth wave generator and said capacitor, said switch tubes each having at least a control grid, an anode and a cathode, said control grids being connected together, the anode of one switch tube being connected to the cathode of the other, and means responsive to the time spacing of said position modulated pulse from said reference pulse to apply to said control grids of said switch tubes the instantaneous potential of said sawtooth wave whereby said output capacitor is charged to the instantaneous potential of said sawtooth wave, said capacitor potential alternating as the time modulation varies with position.

6. In an angle data transmission system having a transmitter pulse modulated by a basic pulse, a sine pulse and a cosine pulse wherein the time spacing between said basic, said sine pulse and said cosine pulse varies in response to the angle to be transmitted, a circuit for converting said angle data into an alternating potential comprising, means responsive to said reference pulse to generate a linear sawtooth wave, an output capacitor adapted to be charged at intervals to the instantaneous potential of said sawtooth wave, a pair of normally nonconductive switch tubes connected between said sawtooth wave generator and said capacitor, said switch tubes each having at least a control grid, an anode and a cathode, said control grids being connected together, the anode of one switch tube being connected to the cathode of the other, means responsive to the time spacing of said position modulated pulse from said reference pulse to apply to said control grids of said switch tubes the instantaneous potential of said sawtooth wave whereby said output capacitor is charged to the instantaneous potential of said sawooth wave, said capacitor potential alternating as the time modulation varies with said angle.

7. In a radio relay radar system having a relay transmitter arranged to transmit angle data and video data, the angle data including a reference pulse, a sine pulse and a cosine pulse having a time spacing related to the angle being transmitted, the video data including a transmission pulse and echo pulses, a radio relay receiver comprising, means responsive to said reference pulse to generate a linear sawtooth wave, an output capacitor adapted to be charged at intervals to the instantaneous potential of said sawtooth wave, a pair of normally nonconductive switch tubes connected between said sawtooth wave generator and said capacitor, said switch tubes each having atl east a control grid, an anode and a cathode, said control grids being connected together, the anode of one switch tube being connected to the cathode of the other, means responsive to the time spacing of said position modulated pulse from said reference pulse to apply to said control grids of said switch tubes the instantaneous potential of said sawtooth wave whereby said output capacitor is charged to the instantaneous potential of said sawtooth wave, said capacitor potential alternating as the time modulation varies with position, a sequence gating circuit including a first pulse generating circuit responsive to said reference pulse to generate a first voltage wave having a time duration long enough to overlap the time of occurrence of said sine pulse, a second pulse generating circuit responsive to time coincidence of said first voltage wave and said sine pulse for generating a second voltage wave having a time duration long enough to overlap time of occurrence of said cosine pulse, a third voltage wave generator responsive to time coincidence of said second voltage wave and said cosine pulse for generating a voltage wave having a time duration long enough to overlap the time of occurrence of said transmission pulse and said echo pulses and means responsive to said third voltage wave to render said first pulse generating circuit unresponsive to input pulses.

ANDREW B. JACOBSEN.

References Cited in the file of this patent

UNITED STATES PATENTS

| Number | Name | Date |
|---|---|---|
| 2,403,210 | Butement | July 2, 1946 |
| 2,403,527 | Hershberger | July 9, 1946 |
| 2,412,669 | Bedford | Dec. 17, 1946 |
| 2,415,981 | Wolff | Feb. 18, 1947 |
| 2,416,330 | Labin | Feb. 25, 1947 |
| 2,418,116 | Grieg | Apr. 1, 1947 |